UNITED STATES PATENT OFFICE.

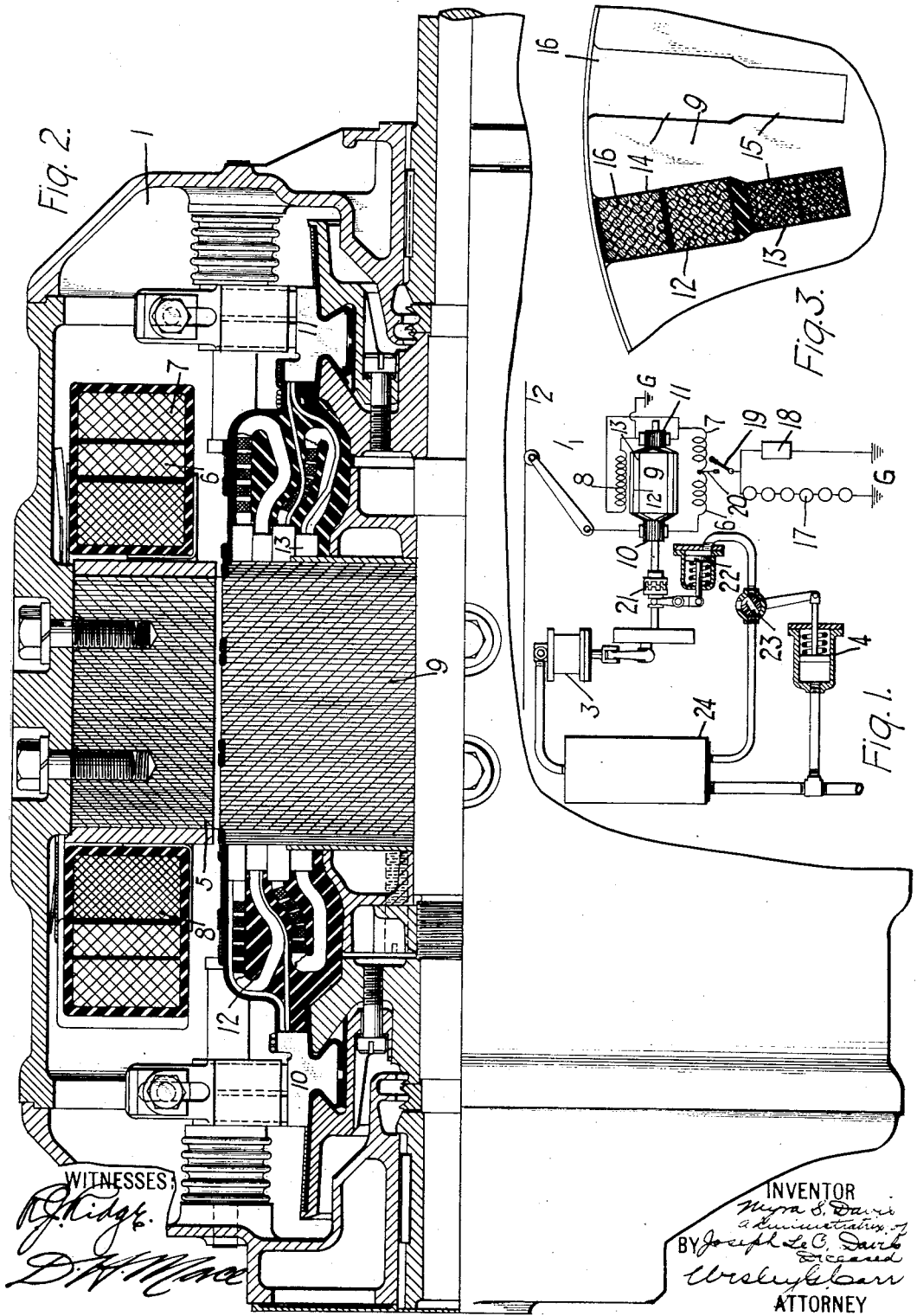

JOSEPH LE CONTE DAVIS, DECEASED, LATE OF PITTSBURGH, PENNSYLVANIA, BY MYRA SHIELDS DAVIS, ADMINISTRATRIX, OF PITTSBURGH, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

1,300,589.     Specification of Letters Patent.     Patented Apr. 15, 1919.

Application filed July 29, 1913. Serial No. 781,746.

*To all whom it may concern:*

Be it known that JOSEPH LE CONTE DAVIS, deceased, late of Pittsburgh, in the county of Allegheny and State of Pennsylvania, during his lifetime invented certain new and useful improvements in Dynamo-Electric Machines, and that I, MYRA SHIELDS DAVIS, administratrix of the estate of the said JOSEPH LE CONTE DAVIS, deceased, do hereby declare to the best of my knowledge and belief that the following specification, taken in connection with the drawings furnished and forming a part of the same, is a clear, true, and complete description of said improvement.

The invention relates to dynamo electric machines, and it has special reference to so called "dynamotors" that are employed upon railway vehicles which are operated upon relatively high voltage direct current railway systems for driving mechanical loads and also for reducing the line voltage to an amount that may be satisfactorily utilized for lighting and control purposes.

The object of the invention is to provide a machine of the above indicated character which shall embody two sets of armature and field windings respectively comprising conductors of different size, whereby economy of space, weight and material may be affected without sacrificing efficiency.

Dynamotors of the general type referred to, are old in the art and their construction and operating characteristics are well-known. However, prior to this invention, this type of machine has embodied two sets of armature windings and field windings composed of coils, the conductors of which were of the same size. Inasmuch as the armature coils are placed one above another in the armature slots, it has been necessary to design the armature of an unnecessarily large diameter in order to avoid an objectionably small sectional area at the bottom of the armature teeth.

As a result of investigation and tests, he discovered that the current traversing the generator end of the machine is always materially less than that traversing the motor end, except under conditions when no external electrical load is connected to the machine, in which case, the total current flows through all of the windings of the machine.

Having these facts in mind, he proposed to reduce the size of the conductors of the armature and field windings constituting the generator portion of the machine and to provide the armature core with slots that are much greater in width at the periphery than at the bottom portions. The armature coils of the smaller size may then be disposed in the narrow bottom portions of the slots and the motor windings of larger size in the upper portions thereof. By making the slots of the shape mentioned, considerable increase in the sectional area at the bottom of the armature teeth is possible which permits of either a machine of lower speed or a reduction in the size and weight of the machine.

Reference may be had to the accompanying drawing in which Figure 1 is a diagrammatic view of a system embodying a dynamotor and Figs. 2 and 3 are, respectively, a view, partially in longitudinal section and partially in elevation, and a view in transverse section of portions of a dynamotor constructed in accordance with the invention.

Referring to Fig. 1, a dynamotor 1 is connected between a source of energy 2 and the ground or return circuit G, and is adapted to mechanically drive an air compressor 3 intermittently, in accordance with the action of a governor 4.

The dynamotor 1 comprises a field magnet structure 5 having a plurality of series field coils 6 and 7 and a shunt field coil 8, and a rotatable armature 9 comprising a plurality of commutator cylinders 10 and 11 having separate and independent armature windings 12 and 13 which are, respectively, disposed in the top portions 14 and bottom portions 15 of a plurality of slots 16 which are provided in the periphery of the armature and which are of greater width at the top than at the bottom. The armature winding 12 and field coils 6 coöperate together in accordance with well-known principles to constitute the motor end of the machine and are connected in series with the field coils 7 and the armature winding 13 which constitute the generator portion of the machine and are composed of conductors of relatively small size. The shunt field winding 8 is connected across the commutator 11 in order to maintain the speed approximately constant and to prevent the machine from running away under no-load conditions.

The field coils 8, 6 and 7 are conveniently wound in concentric relation, being separated and insulated from each other and also bound together in a suitable manner to form unitary structures which surround the polar projections of the field magnet frame 5.

The dynamotor 1, having armature winding 12, field winding 6, field winding 7 and armature winding 13, is normally connected between the supply circuit 2 and ground G and is adapted to deliver a reduced voltage to a lighting circuit 17 and to auxiliary apparatus 18 through a switch 19 which is included in circuit with a conductor 20 that is connected intermediate the series field windings 6 and 7.

The air compressor 3 is adapted to be intermittently associated with the armature 9 of the dynamotor 1 by means of a suitable clutch 21 that is operated by an air piston 22 which receives its operating fluid through a valve 23 from a reservoir 24, the valve being controlled in accordance with the pressure of the pneumatic system by means of the governor 4.

It is evident that, with the switch 19 closed, the dynamotor 1 is adapted to supply energy to the lighting and auxiliary circuits 17 and 18 at reduced voltage and also, at the same time, may serve to mechanically drive the air compressor, when said compressor is associated therewith. Thus, the load upon the dynamotor 1 is both mechanical and electrical in nature and the amount of the load depends upon the conditions of the pneumatic system as well as the number of lamps or other devices that are receiving electrical energy from the dynamotor.

When the switch 19 is open and the compressor 3 is connected to the machine, the total current passes from the supply circuit 2 through the armature winding 12, series field windings 6 and 7 and armature winding 13 to the return circuit G, in which case, the generator end of the machine carries the same current as the motor end. However, if the switch 19 is closed and a heavy lighting load, as well as the compressor, is to be supplied, the generator portion acts to supplement the current flowing through the motor portion and thus serves both as a motor and as a generator to take a portion of the total load. However, the portion of the load carried by the generator end of the machine is always considerably less than that of the motor end, except as the electrical load is disconnected when the load is small, and thus, it is evident that the armature winding 13 and the series field winding 7 may be composed of conductors of much smaller size than those which make up the windings 6 and 12.

It will usually be found advisable to design the machine so that the windings of the generator end will have the same number of turns as those of the motor end and will divide the total voltage substantially equally, although, under certain circumstances, other divisions of the line voltage are contemplated. For instance, if a 1500 volt system and a 600 volt system adjoin one another, it will be necessary to provide less turns on the motor end than on the generator end in proportion to the respective voltages to be impressed thereon, namely—600 volts and 900 volts.

By reducing the size of the armature winding 13 of the generator end of the machine, it is possible to make use of the peculiarly formed slots, which have been described, and, by reason thereof, either to materially reduce the size of the armature 9 and, consequently, the frame of the machine, or, to decrease the speed of rotation accordingly, which is a desirable feature when the dynamotor is employed for the purpose of driving an air compressor.

I do not wish to be limited to the specific structural details shown and described, and desire that only such limitations shall be imposed as are indicated in the appended claims.

I claim as his invention:

1. The combination with a source of electrical energy, a dynamotor connected thereto adapted to intermittently drive a mechanical load and comprising a double commutator armature having a plurality of armature windings composed of conductors of different size, and field magnet windings composed of conductors of different size connected in series circuit between said armature windings, of translating devices connected at one end to said dynamotor at a point between said field windings, whereby one pair of said armature and field-magnet windings is caused to carry a greater amount of electrical energy than the other pair of said windings.

2. The combination with a source of energy and a return circuit, of a dynamotor connected between said circuits and embodying a single field magnet frame, an armature, and a plurality of sets of series-connected armature and field windings composed of conductors of different size, a mechanical load adapted to be intermittently driven by said dynamotor and an electrical load connected between a point intermediate said windings and said return circuit, the set of windings of large size serving as motor windings and the other set either as motor or generator windings, according to the nature and degree of said load.

3. A dynamotor for performing mechanical work at a given line voltage and for supplying an electrical load at a different voltage, embodying a double commutator armature and two sets of series-connected armature and field windings composed of conductors of different size, said windings being connected at their middle point to said load circuit, the conductors of larger size being traversed by current in a single direction and the conductors of smaller size being traversed in either direction according to the character and amount of said load.

In testimony whereof, I have hereunto subscribed my name this 17th day of July, 1913.

MYRA SHIELDS DAVIS,
*Administratrix of Joseph Le Conte Davis Deceased.*

Witnesses:
HELENE BARCHFELD,
CHARLES HARRY BRACKEN.